United States Statutory Invention Registration [19]

[11] Reg. Number: H570

Tylaska et al. [43] Published: Jan. 3, 1989

[54] FAST FOURIER TRANSFORM DATA ADDRESS PRE-SCRAMBLER CIRCUIT

[75] Inventors: Theodore T. Tylaska, Mystic; Thomas C. Choinski, East Lyme, both of Conn.

[73] Assignee: The United States of America as represented by the Secretary of the Navy, Washington, D.C.

[21] Appl. No.: 880,861

[22] Filed: Jun. 3, 1986

[51] Int. Cl.[4] ..... G06F 7/38; G06F 15/32

[52] U.S. Cl. ..... 364/715.01; 364/726

[58] Field of Search ..... 364/715, 726, 900

[56] References Cited

U.S. PATENT DOCUMENTS

| | | | |
|---|---|---|---|
| 3,731,284 | 5/1973 | Thies | 364/726 X |
| 3,810,112 | 5/1974 | Aho et al. | 364/900 |
| 3,961,750 | 6/1976 | Dao | 364/715 X |
| 4,128,872 | 12/1978 | Prioste | 364/900 |
| 4,149,263 | 4/1979 | Prioste | 364/900 |
| 4,181,976 | 1/1980 | Collins et al. | 364/900 |
| 4,396,994 | 8/1983 | Kang et al. | 364/900 |
| 4,490,809 | 12/1984 | Ueda et al. | 364/900 |
| 4,653,019 | 3/1987 | Hodge et al. | 364/900 |
| 4,665,538 | 5/1987 | Machida | 364/715 X |

*Primary Examiner*—stephen C. Buczinski
*Assistant Examiner*—Linda J. Wallace
*Attorney, Agent, or Firm*—Robert F. Beers; Arthur A. McGill; Michael J. McGowan

[57] ABSTRACT

A fast Fourier transform (FFT) data address pre-scrambler technique and circuit for selectively generating pre-scrambled bit reversed, data address sequences needed to perform radix-2, radix-4 and mixed radix-2/4 fast Fourier transforms.

5 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FAST FOURIER TRANSFORM DATA ADDRESS PRE-SCRAMBLER CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a signal processing apparatus and more particularly to a circuit realization of a complicated data sorting or scrambling scheme which is necessary prior to executing various fast Fourier transform (FFT) computations.

(2) Description of the Prior Art

It is well known that the fast Fourier transform is an algorithm which reduces the number of computation steps from $N^2$ to NlogN where N is the size of the transform. This saving in computations amounts to a factor of 200 reduction for the size transforms typically used in signal processing systems. A significant difficulty in using the FFT however is that the selection order in which the data samples are accessed is complicated.

A radix-2, decimation-in-time algorithm can be used to describe the data ordering problem. A key step in the derivation is to sort a naturally ordered input sequence of N points into a subsequence which contains the N/2 even numbered samples and into another subsequence which contains the N/2 odd number samples. Next, the subsequence of even numbered samples is itself sorted into an even group and an odd group. Each of these resulting subsequences include N/4 points each. Similarly the odd samples from the first sort are also sorted into an even and an odd group. The sorting process of breaking each group into a new even group and a new odd group continues until there are only two samples left in each group, and they are already sorted into even and odd because there are only two samples left. Once the original data set is reordered in the above fashion, the computation of the FFT can proceed.

The problem becomes one of determining where each data sample in the original sequence ends up in the sorted sequence. In the past, this reordering or pre-scrambling of data has been accomplished by software, firmware and hardware methods.

The software implementation requires coding the sorting procedure in a language such as FORTRAN. Such sorting is time consuming however because nested loops with variable indices are needed to keep track of which subsequence is being sorted together with its length.

The firmware procedure consists of pre-determining where each data point ends up after sorting and then storing the appropriate address in a read only memory (ROM). The ROM is then accessed while executing the FFT computation to determine the location of the appropriate data sample. However, this look-up-table scheme requires a unique ROM for each different length FFT or different radix FFT to be computed.

The hardware approach to re-ordering the data consists of a scheme known as "bit fiddling". The binary address of a naturally ordered data sample is put in a register and each of the bits are interchanged about the center bit of the register. Usually this bit interchange is accomplished by hardwiring the bits to different positions in the "fiddle" register. The problem associated with this hardware approach is that the bits are always interchanged about the center bit of the register. Thus a different size register is required for each size of FFT encounterd and, the interchange is only applicable to radix-2 FFTs.

SUMMARY OF THE INVENTION

Accordingly, it is a general purpose and object of the present invention to provide a data address pre-scrambler circuit prior to performing FFT computations. It is a further object that the pre-scrambler circuit be adaptable for multi-radix use. Another object is that the circuit work for a wide range of FFT sizes. Still another object is to speed up the FFT computation process.

These objects are accomplished with the present invention by providing an FFT data pre-scrambler circuit for generating reordered address sequences needed to perform radix-26, radix-4 and mixed radix 2/4 fast Fourier transforms.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
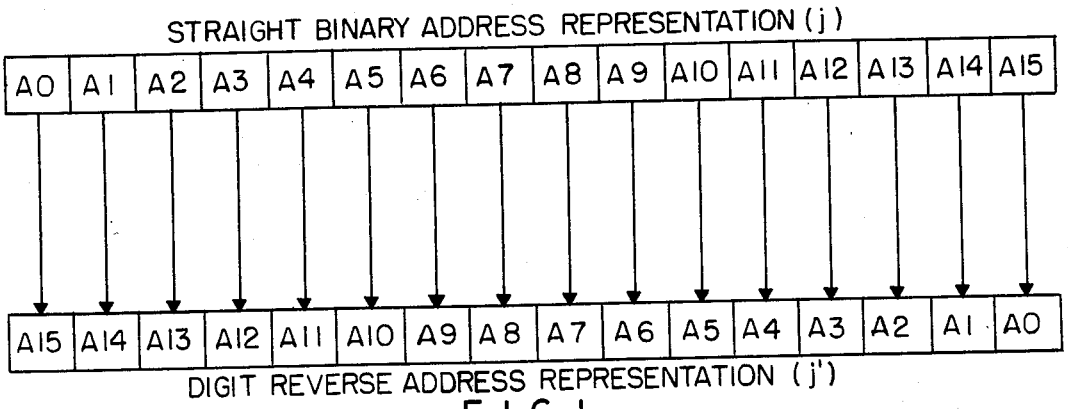
FIG. 1 shows an address register bit reversal scheme for a radix-2 FFT.

The concept behind the data pre-scrambler integrated circuit can be explained by describing the sorts needed for an 8 point, radix-2 FFT. Table 1(a) below gives the original binary ordering, 1(b) below gives the ordering after the first sort, and 1(c) below gives the ordering after the second sort. A third sort is not necessary.

TABLE 1

| Successive Sort of Input Samples for a Radix-2 FFT | | | |
|---|---|---|---|
| $J_2J_1J_0$ | $J_1J_0J_2$ | $J_0J_1J_2$ | |
| 000 | 000 | 000 | Even |
| 001 | 010 | 100 | |
| | 100 | 010 | |

TABLE 1-continued

| Successive Sort of Input Samples for a Radix-2 FFT | | | | |
|---|---|---|---|---|
| $J_2J_1J_0$ | $J_1J_0J_2$ | | $J_0J_1J_2$ | |
| 010 | 110 | Even | 110 | Odd |
| 011 | | | | |
| 100 | 001 | 011 | 001 | Even |
| 101 | 011 | | 101 | |
| 110 | 101 | | 111 | Odd |
| 111 | 111 | | | |
| (a) Original Order | (b) First Sort | | (c) Second Sort | |

Note that after the first sort, all the even points end up in the first half of the sorted sequence and all the odd points end up in the second half of the sequence. The same reordering is obtained by considering the most significant bit (MSB) $J_2$ in the original binary ordering, to be the least significant bit (LSB), and the least significant two bits $J_1J_0$, to be the most significant two bits, i.e., $(J_1J_0J_2)_2$. The second sort shown in column (c) separates the even sequence from the first sort into even and odd sequences, and the odd sequence from the first sort is also separated into even and odd sequences. Observe that the result of the re-ordering is obtained by making the most significant bit $J_1$ of the $J_1J_0$ bit pair, the least significant bit of the pair to obtain $J_0J_1$. A third sort is not necessary since there are only two samples in the resulting subsequence and they are already in even, then odd order.

After sorting, the location of an original sample point can be determined by performing a bit reversal procedure for radix-2 FFT's i.e., if $(J_2J_1J_0)_2$ is the binary address representation of an original sample point, that sample point ends up at address $(J_0J_1J_2)_2$ after the sorting in the various stages required to derive the FFT.

This process generalizes for the radix-4 case by sorting the original N point sequence into four sequences composed of the sample points 4r, 4r+1, 4r+2, and 4r+3, where r=0, 1, . . . (N/4−1). Then each of these four resulting subsequences is independently sorted the same way, i.e., the subsequence 4r is sorted into 4q, 4q+1, 4q+2, 4q+3, where q=0, 1, . . . (N/16−1).

The sorting process continues for $\log_4(N)$ stages. The re-ordering of the original data can be accomplished by digit reversing the base 4 digits or by pair-wise reversing the binary bit representations of the sample index. For example, if $(J_3J_2J_1J_0)_2$ is the binary representation of the original sequence, the sorted sequence will be ordered as $(J_1J_0J_3J_2)_2$.

If the original sample contained $N=4^3$ points then three sorts would be required. The last sort need not be actually performed since there would be only 4 points in the 16 resulting subsequences, and they are already naturally sorted. If the binary representation of the original sequence was $(J_5J_4J_3J_2J_1J_0)_2$ the samples would end up in the location represented by $(J_1J_0J_3J_2J_5J_4)_2$ from which the radix-4 FFT computations would be done.

For the mixed radix case, the sorted ordering of the data can be obtained by either interchanging bits or pairs of bits, e.g., suppose $32=2(4)^2$ data points are to be transformed by performing a decimation-in-time transform of radix-2 first, followed by two radix-4 transforms. In the derivation of a 2-4-4 transform, a radix-4 stage would be derived followed by another radix-4 stage, followed by a radix-2 stage. However, the actual computation would proceed with the radix-2 stage first, followed by the two radix-4 stages Let $(J_4J_3J_2J_1J_0)_2$ be the binary representation of the original data sequence. The input data would be sorted by 4's then by 4's again, and finally by 2's into even and odds. The interchange procedure would be $(J_2J_1J_0J_4J_3)_2$, then $(J_0J_2J_1J_4J_3)_2$ where the entities $J_4J_3$ and $J_2J_1$ are treated as pairs which remain in fixed positions relative to each other.

The digit interchanges thus far described can be generalized to include mixed radix FFT's where the number of points to be transformed can be represented by $N=n_mn_{m-1}n_{m-2}\ldots n_1$ where $n_i$ are the factors that make up N. The natural order of these n points is given by an address J where $$J=j_mn_{m-1}n_{m-2}\ldots n_1+j_{m-1}n_{m-2}n_{m-3}\ldots n_1+\ldots+j_2n_1+j_1 \quad (1)$$

where N is the number of data points to be transformed, m is the number of factors of N, $j_i$ are the respective digits of j and i=1, . . . ,m. After sorting by $n_1$, then sorting each of the resulting subsequences by $n_2$, then sorting each of those resulting subsequences by $n_3$, etc., the original set of order points whose address is given by J ends up in a new location whose address is given by $$J'=j_1n_2n_3\ldots n_m+j_2n_3n_4\ldots n_m+\ldots+j_{m-1}n_m+j_m. \quad (2)$$

It can be seen that the same result can be obtained by reversing the order of the digits $j_i$ in the representation of the new address J'; thus the result of the multiple sorting can be represented by J'.

The present invention implements the pre-scrambling scheme represented by J'. The particular embodiment of the invention is specifically shown for radix-2, radix-4 and radix-2/4 FFT algorithms. The results from these three applications is then combined in an FFT data pre-scrambler circuit which is used as an address pointer for accessing data in the proper order. The data pre-scrambler selectively operates in a radix-2, radix-4, or radix-2/4 mode.

FIG. 1 shows a radix-2 FFT data pre-scrambling scheme. The bit reversal procedure indicated by equations (1) and (2) can be best exemplified when N is a power of 2 (i.e., $N=2^m$) and a radix-2 FFT algorithm is used to perform the transform. For this case J and J' are $$J=j_m2^{(m-1)}+\ldots+j_22+j_1 \quad (3)$$

$$J'=j_12^{(m-1)}+j_22^{(m-2)}+\ldots+j_m \quad (4)$$

Thus, the order of each radix-2 digit in the binary address sequence is reversed. The most significant bit (MSB) is exchanged with the least significant bit (LSB). Likewise, the second most significant bit is exchanged with the second least significant bit, and so on. In effect, the binary representation of the address is reversed as shown in FIG. 1 for a 16-bit binary address pointer.

Figure 2:
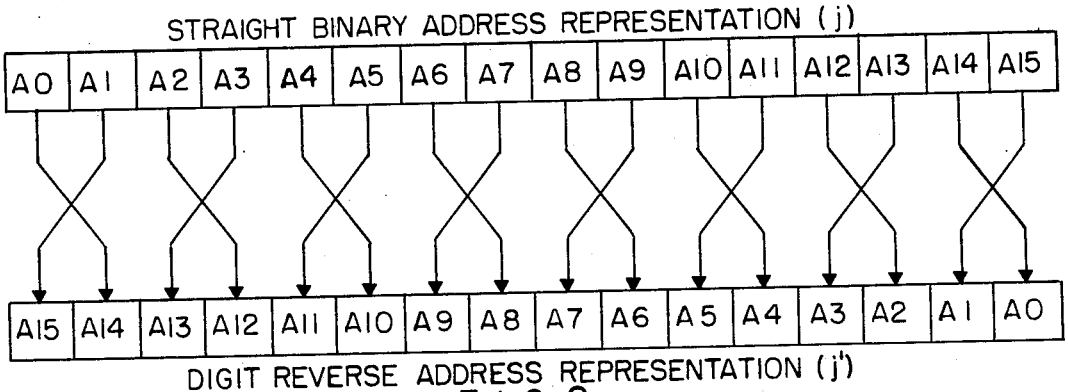
FIG. 2 shows an address register bit reversal scheme for a radix-4 FFT.

FIG. 2 shows a radix-4 FFT data pre-scrambling scheme. The higher radix FFT algorithms and in particular the radix-4 FFT are more efficient than the radix-2 FFT. The radix-4 FFT requires $N=4^m$. So J and J' will be $$J=j_m4^{(m-1)}+\ldots j_24+j_l \quad (5)$$

$$J'=j_14^{(m-1)}+j_24(m-2)+\ldots+j_m \quad (6)$$

where $j_i=0,1,2,3$ and $i=1, 2, \ldots, m$. If a binary number is used to represent the address J, the bit reversal procedure switches radix-4 digits (i.e., groups of 2 binary bits) of the address. Therefore, the two most significant binary bits (the most significant radix-4 digit) is exchanged with two least significant binary bits (the least significant radix-4 digit), and so on. In each exchange of groups of two binary bits the significance of each bit within the group must be preserved as shown in FIG. 2 for a 16-bit binary address pointer.

Figure 3:
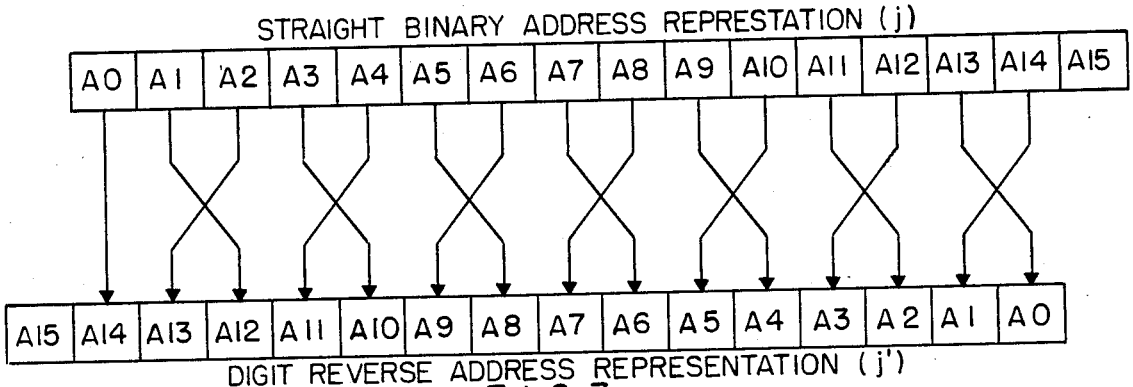
FIG. 3 shows an address register bit reversal scheme for a mixed radix FFT with radix-2 stage performed first.

FIG. 3 shows a mixed radix-2/4 data pre-scrambling scheme. Mixed radix-2/4 FFT algorithms allow users to take advantage of the efficiency of the radix-4 algorithm for data sets which are powers of 2 but not powers of 4. If N is a power of 2 it can be factored so $N=(2)4^{(m-1)}$. Therefore, the FFT can be performed with one radix-2 stage and the remaining stages as radix-4 stages. The radix-2 stage can be put anywhere in an FFT flow graph, but its location will effect the digit reversal procedure. If the radix-2 stage is performed first in the FFT flow graph then J and J' will be calculated to be $$J=j_m(2)4^{(m-1)}+\ldots+j_2 2+j_1 \quad (7)$$

$$J'=j_1 4^{(m-1)}+j_2 4^{(m-2)}+\ldots+j_m \quad (8)$$

where $j_i=0,1,2,3$ for $i=0,1, \ldots, (m-1)$ and $j_m=0,1$. FIG. 3 shows the digit reversal procedure for a 16-bit address pointer given a mixed radix-2/4 case when the radix-2 stage is performed first. Note that all the digit exchanges are performed with groups of 2-binary bits except for the MSB of J.

Figure 4:
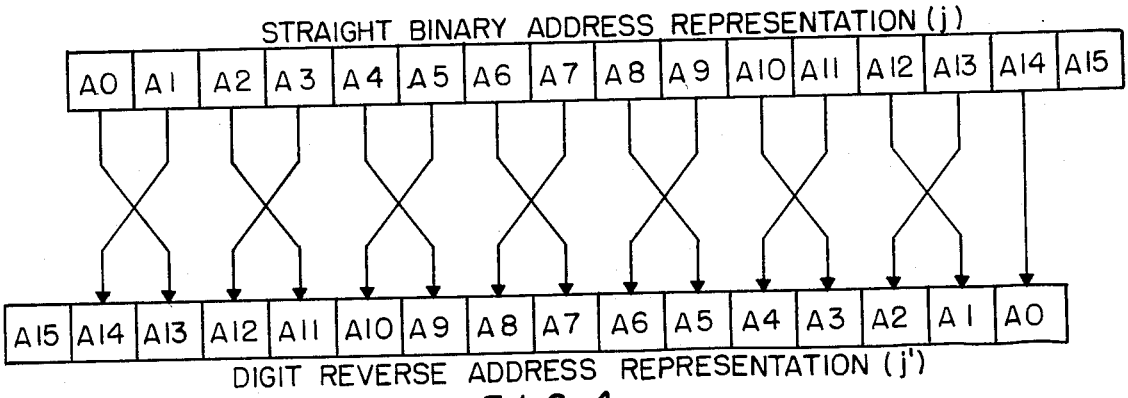
FIG. 4 shows an address register bit reversal scheme for a mixed radix FFT with radix-2 stage performed last.

When the radix-2 stage is performed in the last stage of the FFT signal flow graph the addressing digit reversal procedure will define J and J' to be $$J=j_m 4^{(m-1)}+\ldots+j_2 4+j_1 \quad (9)$$

$$J'=j_1(2)4^{(m-2)}+j_2 4^{(m-3)}+\ldots j_m \quad (10)$$

where $j_i=0,1,2,3$ for $i=2,3, \ldots, m$ and $j_1=0,1$. FIG. 4 shows the digit reversal procedure for the binary representation of a 16-bit address when the radix-2 stage is performed last. All the exchanges are performed with groups of two binary bits except for the LSB of J.

Figure 5:
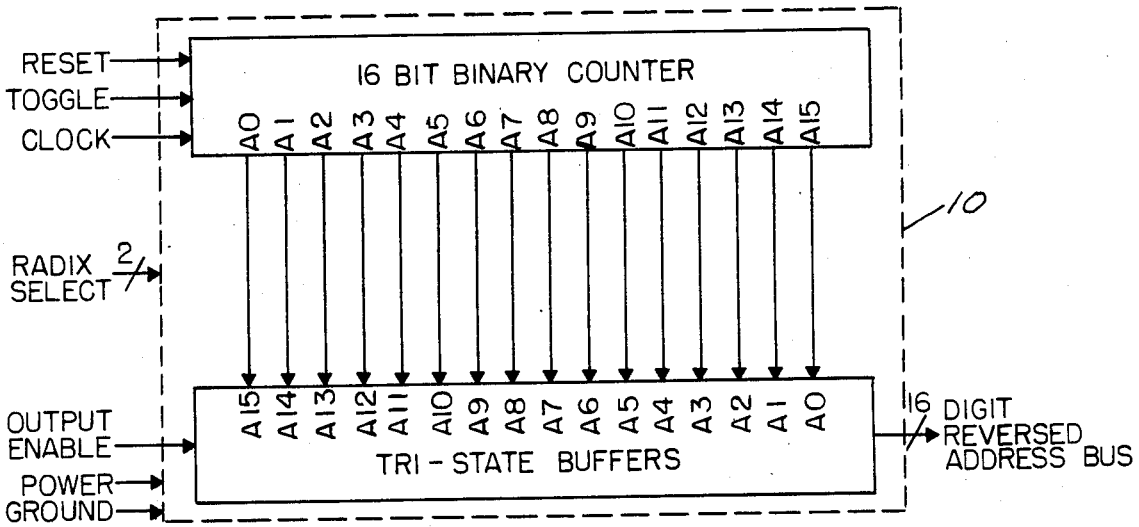
FIG. 5 shows a radix-2 digit reversed counter block diagram.
Figure 6:
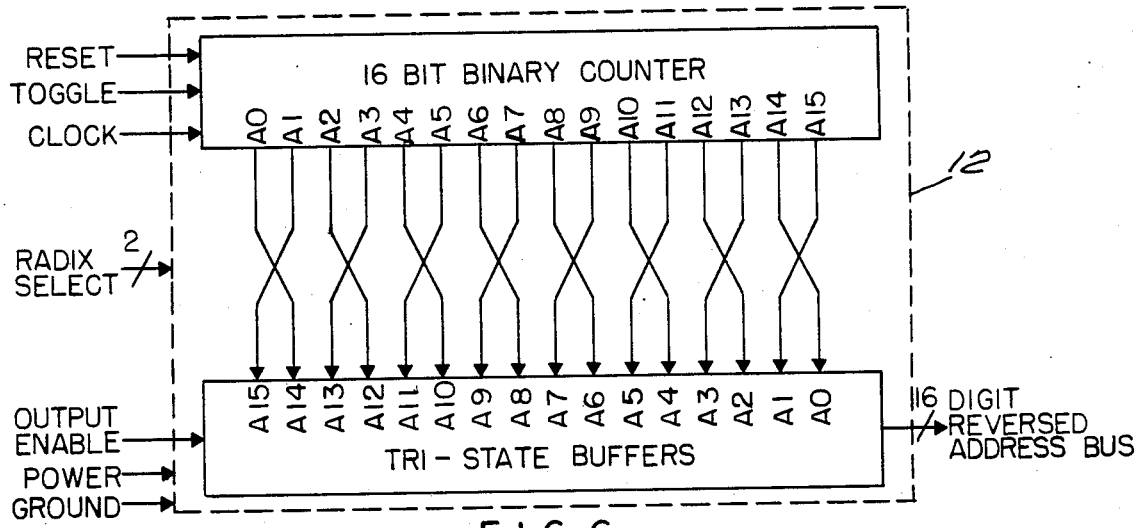
FIG. 6 shows a radix-4 digit reversed counter block diagram.
Figure 7:
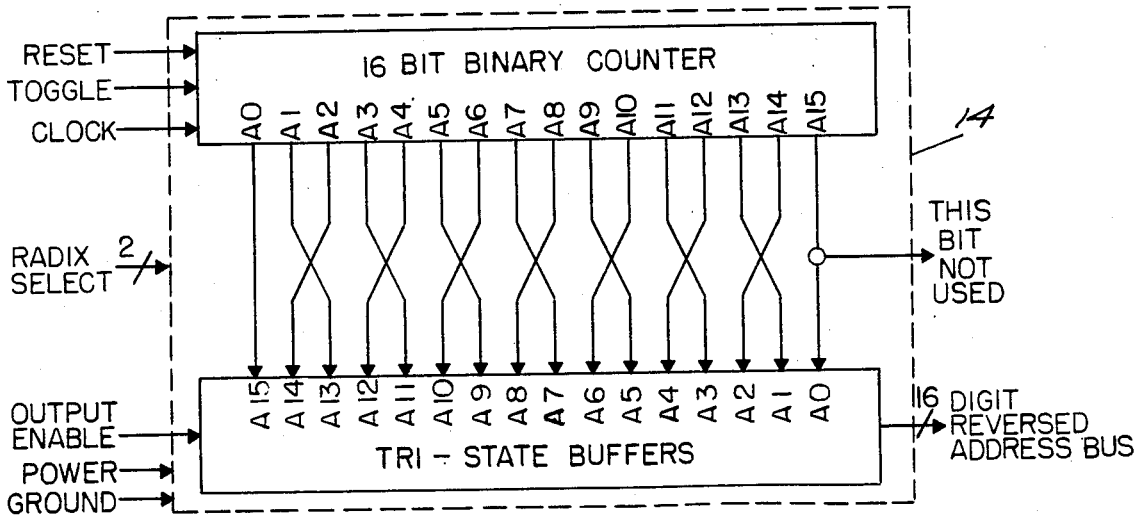
FIG. 7 shows a mixed radix 2/4 digit reversed counter block diagram.

The design of the data pre-scrambling circuits are straightforward once the proper address digit reversal procedure for the radix of interest has been determined. The design centers around a straight binary counter with its most significant bits interchanged with its LSB bits. The counter cycles its count from zero to $N-1$. The binary bits outputed from the counter are used to generate the pre-scrambled address, the bits being physically routed to an address pointer using the mapping procedures depicted in FIGS. 1 through 4. Separate block diagrams for hard wired radix-2, radix-4 and radix-2/4 counters 10, 12 and 14 respectively are shown in FIGS. 5, 6 and 7 respectively.

Figure 8:
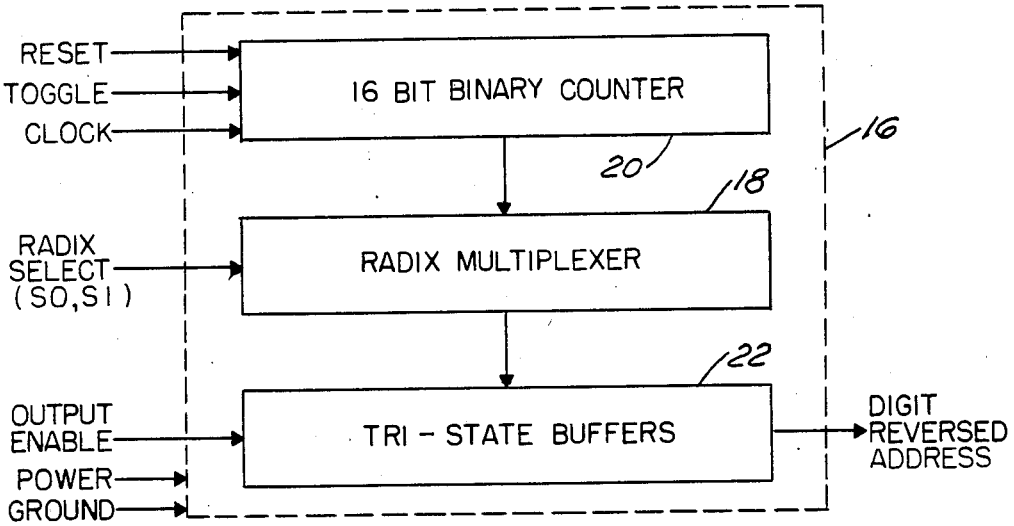
FIG. 8 shows a radix selectable digit reversed counter block diagram.

FIG. 8 shows the block diagram for a generalized digit re-ordering counter 16 which is capable of providing any one of the three above cited radix selections via two external select pins S0 and S1. Selectable radix FFT data pre-scrambler 16 is realized by inserting a radix multiplexer (switching network) 18 between binary counter 20 and tri-state buffers 22 which feed the reversed address to the data address bus.

Figure 9A:
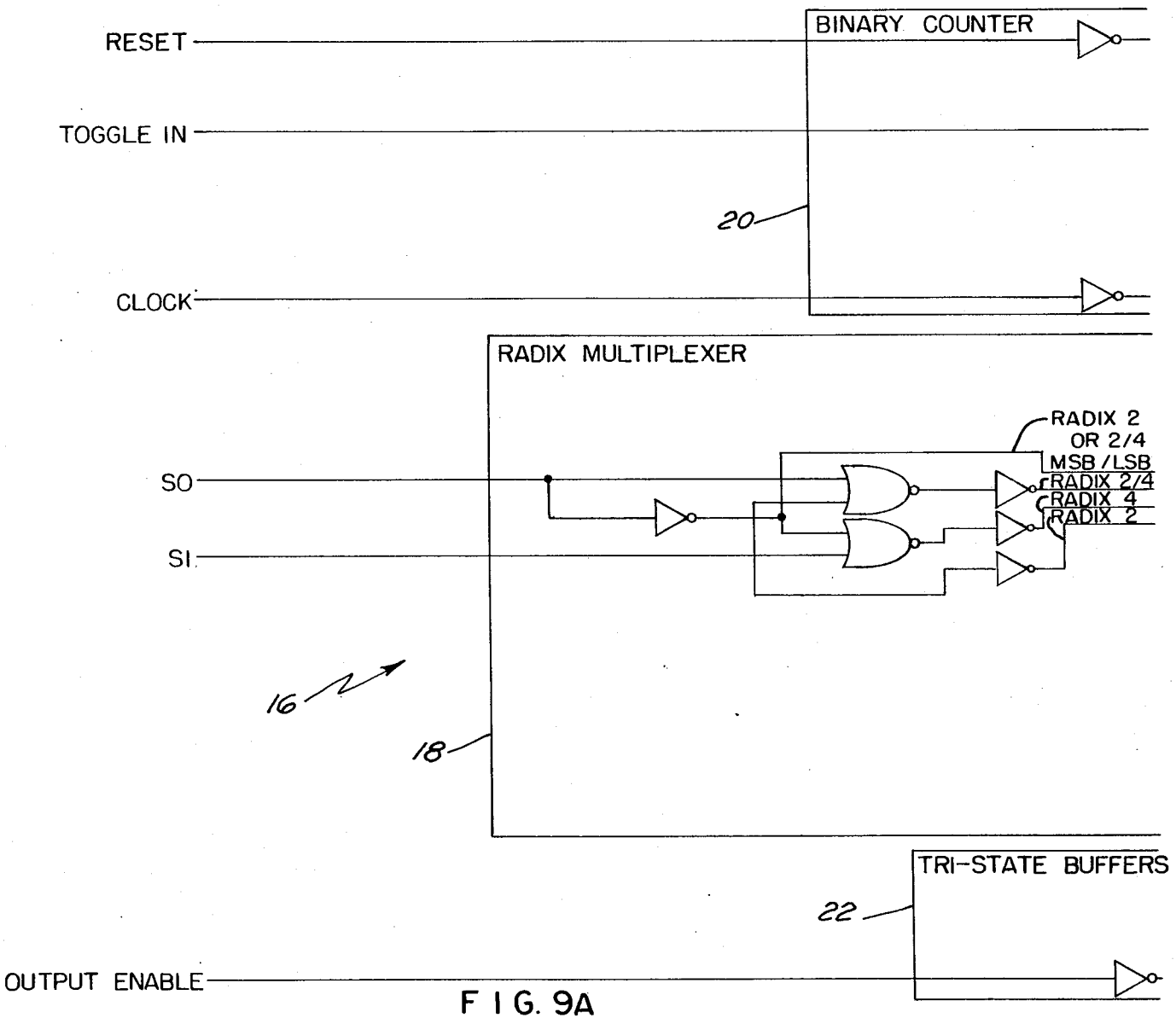
FIGS. 9A, B and C show a circuit diagram for the radix selectable data pre-scrambler circuit of FIG. 8.

An exemplary logic schematic for a radix selectable, digit reversed counter 16 depicted in FIG. 8 is given in FIGS. 9A, B and C. Binary counter 20 is a 16-bit straight binary counter further comprising 16 J-K flip-flops 24 and interconnecting AND gates 26 arranged so as to produce, as the output thereof, sequential 16-bit binary addresses. Multiplexing circuit 18 comprises sixteen sets of NAND gates, one set for each address bit of counter 20. A most significant bit NAND set 28, a least significant bit NAND set 30 and fourteen intermediate bit NAND sets 32 are provided and interconnected as shown. The re-ordered radix-2, radix-4 or radix-2/4 address bits from counter 20 are fed to the appropriate output address tri-state buffers 22 by selecting the values on select lines S0 and S1 from Table 2 below, which lines selectively reroute the address bits from counter 20 to output buffers 22 as shown in FIGS. 1-7.

TABLE 2

| | Radix Selection Logic | |
|---|---|---|
| RADIX | S1 | S0 |
| Radix-2/4 | 0 | 0 |
| Radix-4 | 0 | 1 |
| Radix-2 | 1 | 0 |
| X | 1 | 1 |

It is noted that alternate multiplexing circuits may be used and such are well within the skills of one schooled in the art of logic circuit design.

Figure 10:
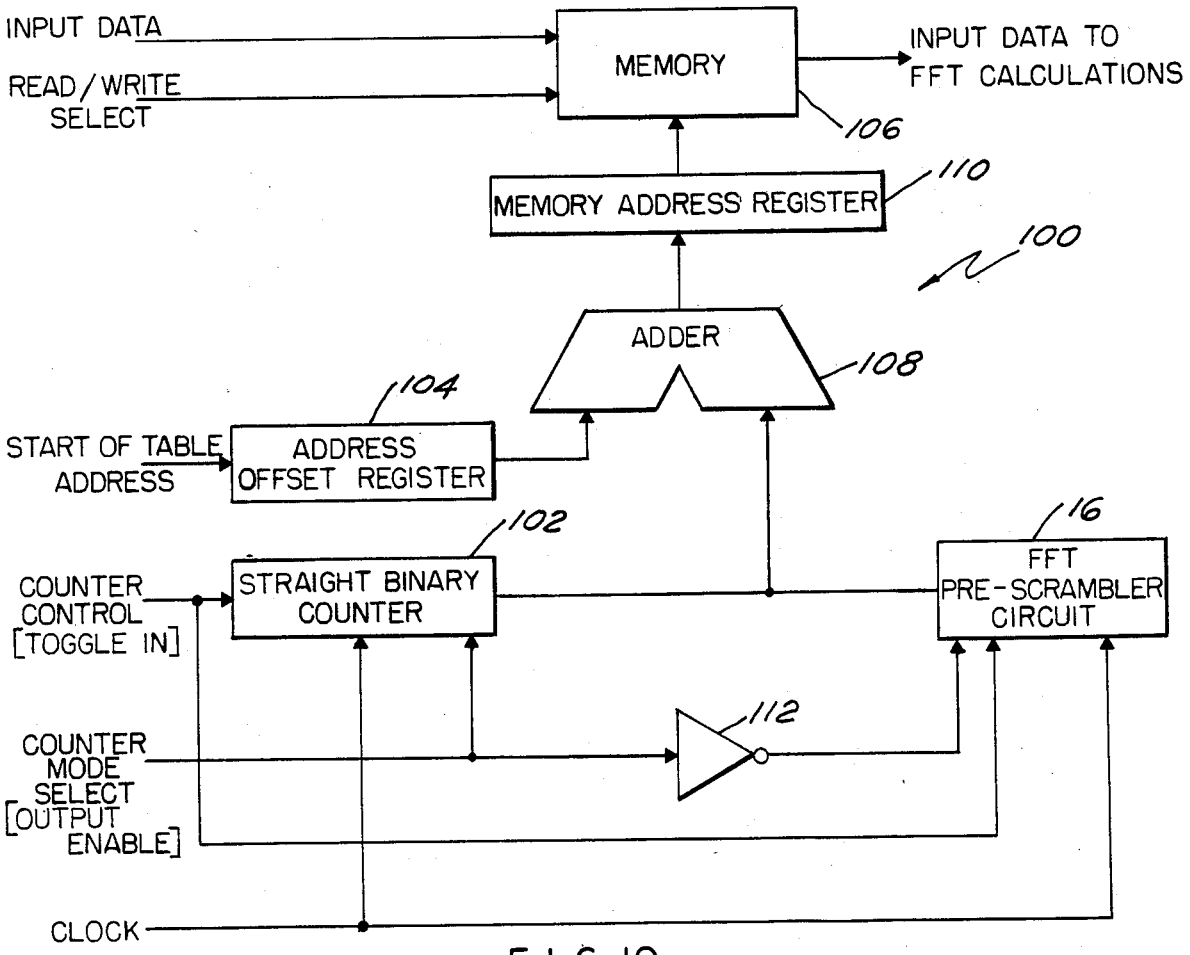
FIG. 10 shows a block diagram of an FFT processor memory system.

In operation the pre-scrambler circuit is included as part of an FFT processor system 100 such as the one shown in FIG. 10. Only the portions of the processor system needed to demonstrate the relation of FFT pre-scrambler circuit 16 to system 100 is shown. A straight binary counter 102 is used generate a block of time-series input data addresses in natural order. A base address offset register 104 is used in conjunction with counter 102 to determine in which area of memory 106 the input data is sequentially stored. The base address from register 104 is combined with the count from counter 102 in adder 108 and stored in memory address register 110 for use during memory write operations. The tri-state buffer output end of counter 102 is selectively energized while the tri-state buffers of pre-scrambler circuit 16 are placed in a high impedance state by inverter 112. After the block of time-series data has been stored, the tri-state control (counter mode select) is placed at logic "0" and the pre-scrambler circuit generated addresses are then stored in address register 110 and used by the FFT processor to read the data in the selectively scrambled order during its FFT calculations.

What has thus been described is an FFT data address pre-scrambler technique and circuit for generating pre-scrambled address sequences needed to selectively perform radix-2, radix-4 or mixed radix-2/4 fast Fourier transforms.

Figure 9B:
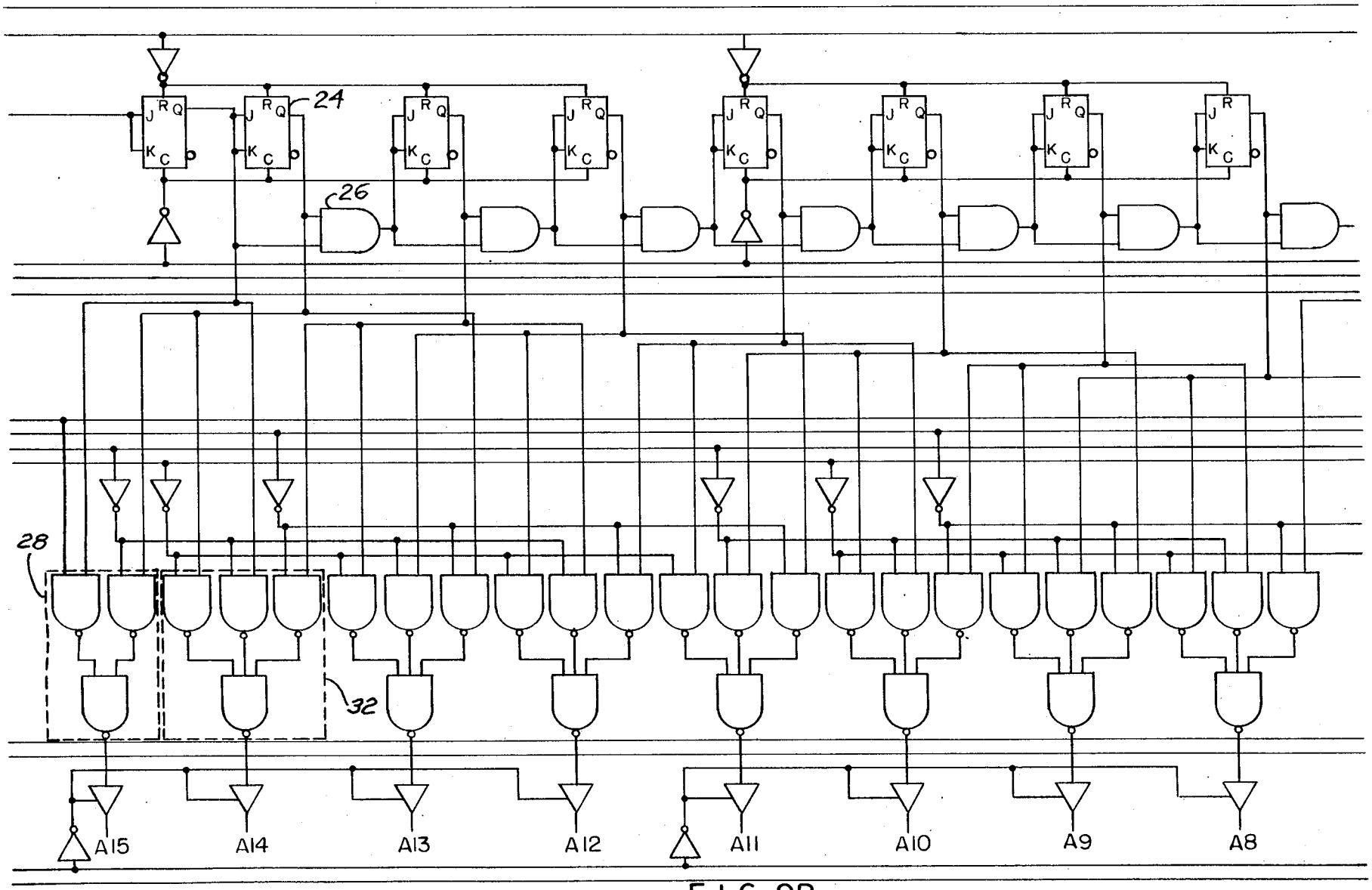
Figure 9C:
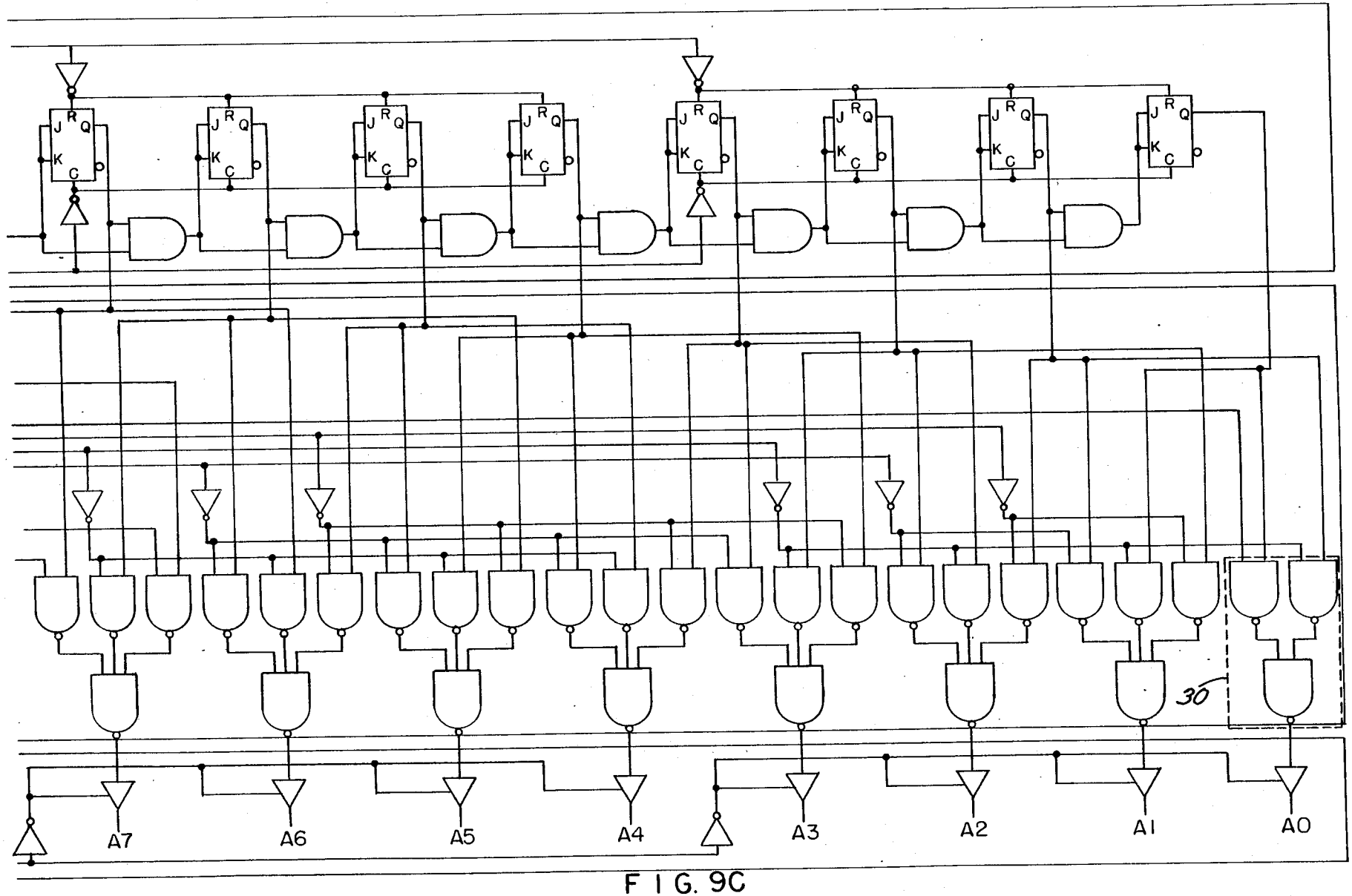

Obviously many modifications and variations of the present invention may become apparent in light of the above teachings. For example, the selectable radix, FFT data address pre-scrambler circuit shown in FIG. 9 can be implemented using toggle flip-flops instead of JK flip-flips, and pass transistor switches in place of the NAND gate multiplexing circuit. The radix selectable data pre-scrambler circuit can also be altered to accommodate smaller or larger FFT sizes if the desired sizes are known to have fixed ranges for the particular application. The specific circuit shown in FIG. 9 will work for any FFT size between 4 and 64K.

In light of the above, it is therefore understood that within the scope of the appended claims, the invention may be practiced otherwise than as specifically described.

What is claimed is:

1. An apparatus, used in conjunction with an FFT processing system, for selectively re-ordering the memory address digits of pre-stored data samples, comprising:

binary counter means for generating a contiguous sequence of multi-digit memory addresses;

radix multiplexing means, connected to said binary counter means, for receiving said sequence of multi-digit memory addresses and re-ordering said digits of said sequence of memory addresses based on a pre-selected radix such that said re-ordered memory addresses facilitate FFT calculations using said pre-stored data samples; and output means, connected to said multiplexing means, for receiving said re-ordered memory addresses from said multiplexing means and transmitting said addresses over the address bus of said system during said FFT calculations.

2. An apparatus according to claim 1 wherein said binary counter means further comprises sixteen output bit address lines thereby producing addresses ranging sequentially from 0 to $2^{16}-1$.

3. An apparatus according to claim 2 wherein said radix multiplexing means further comprises;

radix select means, having binary input lines S0 and S1, for selecting one among radix-2, radix-4 and mixed radix-2/4 logic paths based on the chosen state of said binary input lines; and a plurality of NAND gate sets, one set for each said address digit and connected to said radix select means, for being selectively activated by said radix select means so as to configure said apparatus for said preselected radix.

4. An apparatus according to claim 3 wherein said output means further comprises a plurality tri-state buffers, one each connected to each said NAND gate set.

5. An apparatus according to claim 4 wherein said plurality of NAND gate sets further comprise a MSB gate set, a LSB gate set and a plurality of intermediate gate sets.

* * * * *